United States Patent [19]
Paskert

[11] 3,858,151
[45] Dec. 31, 1974

[54] FLEXIBLE CONDUIT CONNECTOR
[75] Inventor: Joseph Henry Paskert, Lakewood, Ohio
[73] Assignee: Eaton Corporation, Cleveland, Ohio
[22] Filed: June 4, 1973
[21] Appl. No.: 366,341

[52] U.S. Cl. .................. 339/14 R, 174/51, 285/162
[51] Int. Cl. ............................................. H01r 3/06
[58] Field of Search ................. 339/13, 14; 174/51; 285/162; 287/20; 248/56

[56] References Cited
UNITED STATES PATENTS

| | | | |
|---|---|---|---|
| 1,725,883 | 8/1929 | Recker | 285/162 |
| 2,128,040 | 8/1938 | Connors | 285/162 |
| 2,430,809 | 11/1947 | Flora et al. | 248/56 |
| 2,706,647 | 4/1955 | Gillespie | 285/162 |
| 3,183,297 | 5/1965 | Curtiss | 174/51 |
| 3,221,572 | 12/1965 | Swick | 248/56 |

FOREIGN PATENTS OR APPLICATIONS
495,130  8/1949  Canada .............. 285/162

Primary Examiner—Roy D. Frazier
Assistant Examiner—Robert A. Hafer
Attorney, Agent, or Firm—Teagno & Toddy

[57] ABSTRACT

An improved connector for securing a helically grooved flexible electrical conduit with a junction box is formed as a one-piece metal clip. The clip has a tubular body with tabs and barbs which engage the helical groove in the conduit to prevent the conduit from being pulled out of the clip and to electrically interconnect the clip and conduit. The barbs and tabs are disposed along a common helical path to facilitate turning or screwing of the clip onto one end of the conduit. A collar on the inner end of the clip encloses the end of the conduit to protect wires in the conduit against engagement with any burrs which may be formed on the end of the conduit. Resiliently deflectable retaining arms and flanges clampingly engage a wall of the junction box to hold the clip and conduit in place. The retaining arms are provided with pointed end portions which are pressed against the wall of the junction box to electrically interconnect the clip and junction box.

7 Claims, 5 Drawing Figures

FLEXIBLE CONDUIT CONNECTOR

BACKGROUND OF THE INVENTION

The present invention relates to a new and improved connector for attaching a helically grooved flexible conduit to a junction box or the like.

One known method of connecting an electrical conduit with a junction box has been to utilize a die cast threaded sleeve and nut assembly. In addition, various clip assemblies have been utilized to connect helically grooved flexible conduits with junction boxes and other members. Some of these known clip assemblies are disclosed in U.S. Pat. Nos. 1,215,595; 2,869,905; 3,139,768; 3,221,572; and 3,366,405.

SUMMARY OF THE INVENTION

The present invention relates to an improved one-piece metal clip which is utilized to connect a helically grooved electrical conduit with a junction box or other member. The clip is constructed so that it could be readily connected with one end of the conduit and the junction box. Once the clip is connected to the junction box, the body of the clip is disposed within the junction box where it is protected against engagement with foreign objects. The clip engages the electrical conduit in such a manner as to prevent disengagement of the conduit from the clip by either pulling or turning of the conduit. In addition, the clip is constructed in such a manner so as to dig into both the electrical conduit and the junction box to provide a positive grounding of the conduit to the junction box.

The clip has a tubular wall with tabs which threadedly engage the helical groove in the conduit. As the tubular wall of the clip is pushed through an opening in the junction box, retaining arms are resiliently deflected inwardly until flanges on the outer end of the clip have been firmly pressed against an outer surface of the junction box. The retaining arms will then snap outwardly to securely clamp the wall of the junction box and hold the clip and the flexible conduit against movement relative to the junction box. As the clip passes through the opening in the junction box, barbs formed on the tubular wall dig into the flexible conduit to provide a solid electrical connection between the conduit and the clip and to prevent backthreading of the clip. The retaining arms have pointed corners which dig into the junction box to provide a solid electrical connection between the clip and the junction box.

BRIEF DESCRIPTION OF THE DRAWINGS

The foregoing and other features of the invention will become more apparent upon a consideration of the following description taken in connection with the accompanying drawings wherein.

DESCRIPTION OF ONE PREFERRED EMBODIMENT OF THE INVENTION

Figure 1:
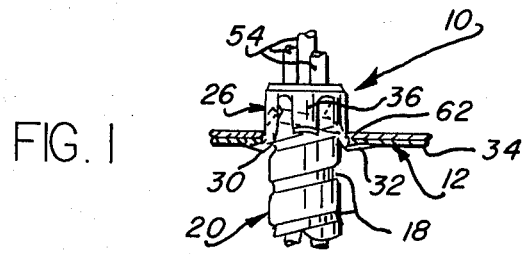
FIG. 1 is a sectional view of a cable connected with a junction box by a clip constructed in accordance with the present invention.
Figure 2:
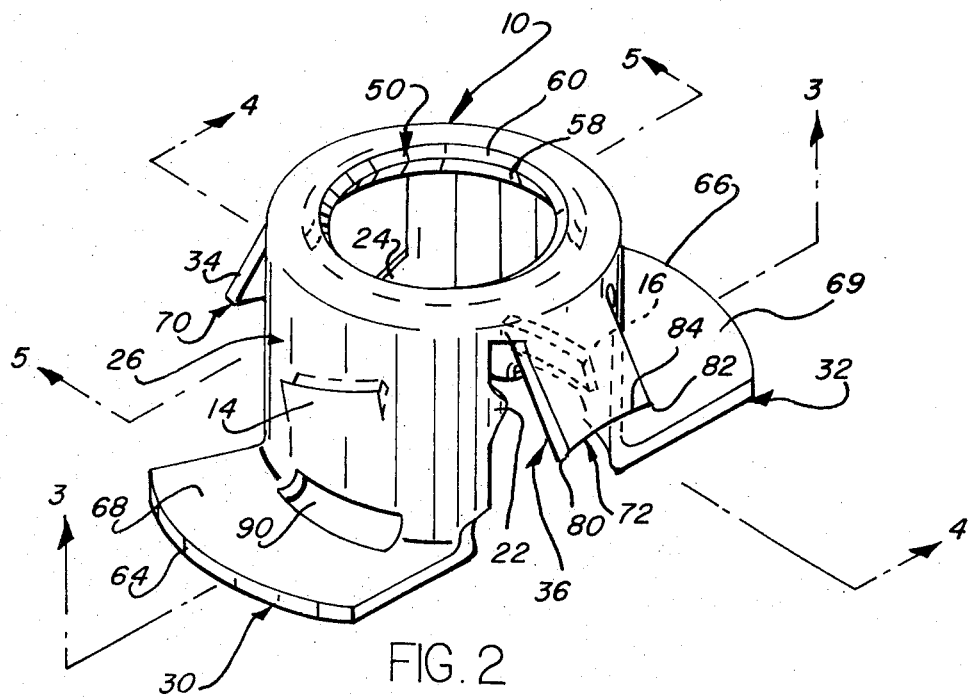
FIG. 2 is an enlarged pictorial illustration of the clip of FIG. 1.

An improved clip 10 constructed in accordance with the present invention is illustrated in FIG. 1 in association with a wall 12 of a junction box. The clip 10 is provided with inwardly projecting tabs 14 and 16 (see FIG. 2) which are disposed in threaded engagement with a helical groove 18 formed in a flexible electrical conduit 20 to prevent the conduit from being pulled out of the clip. To prevent the conduit 20 from being backthreaded out of the clip 10 and to provide a solid electrical connection between the clip and the conduit, barbs 22 and 24 dig into the helical groove. The clip itself is held against movement relative to the wall 12 of the junction box by the cooperation between a pair of outwardly projecting flanges 30 and 32 and retaining arms 34 and 36 which engage opposite sides of the wall 12.

Figure 5:
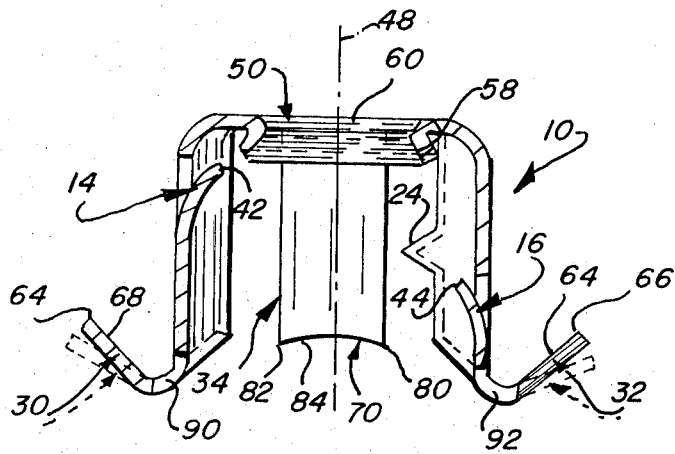
FIG. 5 is a sectional view, taken generally along line 5—5 of FIG. 2, illustrating the relationship between a pair of tabs and a barb formed on a tubular wall of the clip.

When the electrical conduit 20 is to be installed in a junction box, the clip 10 is turned or threaded onto one end of the conduit 20. To facilitate threading the clip 10 onto the conduit 20, the tabs 14 and 16 are formed with inner end portions 42 and 44 (see FIG. 5) which are disposed on a helix of the same pitch as the helix of the groove 18 in the flexible conduit 20. In addition, the rectangular tabs 14 and 16 are cut with their inner-edge portions 42 and 44 sloping at the same angle relative to a central axis 48 of the clip 10 as in which the turns of the helical groove 18 slope relative to the longitudinal axis of the conduit 20. Therefore, the inner surfaces 42 and 44 of the tabs 14 and 16 form a portion of a helix of substantially the same pitch and diameter as the pitch and diameter of the helical groove 18 in the exterior wall of the conduit 20.

Figure 3:
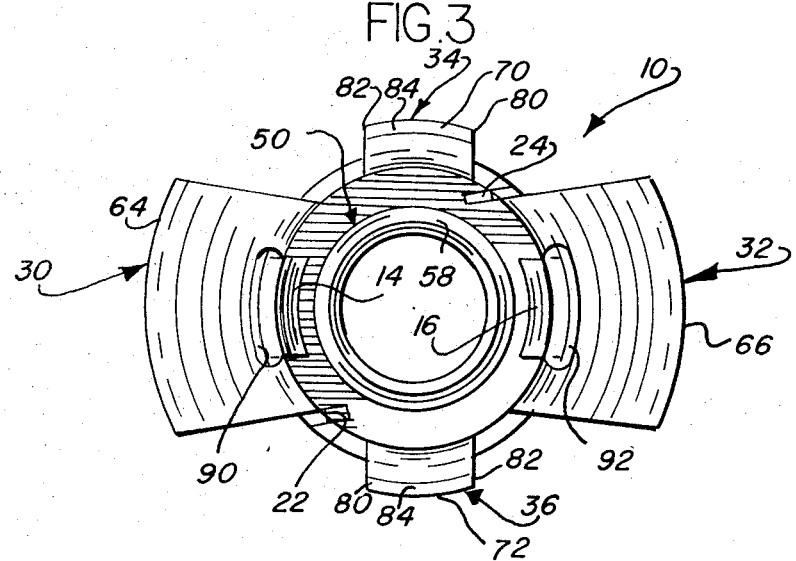
FIG. 3 is a plan view, taken generally along line 3—3 of FIG. 2, further illustrating the construction of the clip.

The barbs 22 and 24 dig into the helical groove 18 to provide a solid electrical connection between the conduit 20 and clip 10, and to prevent backthreading of the conduit. The barbs 22 and 24 project inwardly from the tubular wall 26 of the clip 10 (see FIG. 3). To facilitate turning the clip 10 onto the end of the conduit 20, the barbs 22 and 24 are disposed along the same helix as the inner ends 42 and 44 of the tabs 14 and 16. This helix is of the same pitch as the helical groove 18. Thus, as the clip is turned onto the end of the conduit 20, the tabs 14 and 16 and barbs 22 and 24 all engage the helical groove 18. It should be noted that the pointed ends of the barbs 22 and 24 and the inner ends of the tabs 14 and 16 either just clear the bottom of the groove 18 or scrape slightly against it as the clip 10 is threaded onto the conduit 20.

The tubular wall 26 of the clip 10 is constructed so that it has an outside diameter which is just slightly larger than the inside diameter of the opening in the wall 12. Therefore the flexible tubular wall 26 is resiliently flexed inwardly to press the barbs 22 and 24 against the bottom of the groove 18 as the clip is shoved into the hole in the wall 12. In addition, the tabs 14 and 16 will be pressed firmly against the bottom of the groove 18. This results in the barbs 22 and 24 digging into the conduit 20 to provide a firm electrical connection between the clip and the conduit. Since both the tabs 14 and 16 and the barbs 22 and 24 are disposed in tight engagement with the groove 18 in the conduit 20, a relatively large force is required in order to pull the conduit out of the clip. However, it should be noted that when the conduit 20 is used in an environment wherein only small forces are applied to the conduit, only the tabs 14 and 16 or only the barbs 22 and 24 may be utilized to grip the groove 18 in the conduit.

Figure 4:
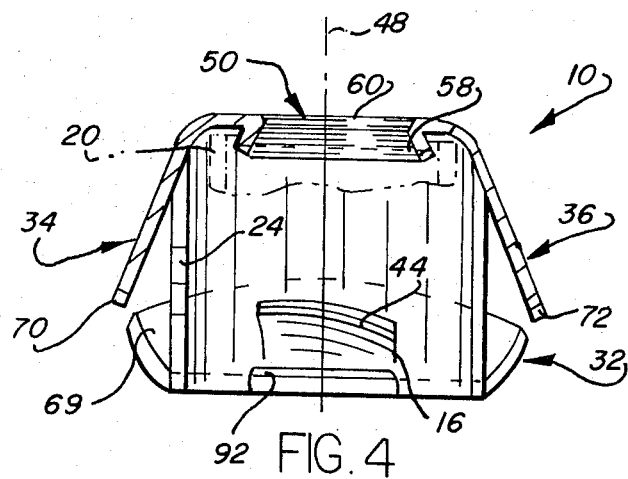
FIG. 4 is a sectional view, taken generally along line 4—4 of FIG. 2, illustrating the relationship of a pair of outwardly extending retaining arms to tubular wall portions of the clip.

As the clip 10 is turned onto the flexible conduit 20, an annular collar 50 in the inner end of the clip telescopes inside the conduit 20 in a manner illustrated in dash lines in FIG. 4. This enables the collar 50 to shield wires 54 (see FIG. 1) against engagement with any burrs which may have been formed on the end of the conduit as it was cut to the desired length. The collar 50 includes an annular inner rim 58 which extends inside the end of the conduit 20 (see FIG. 4). An annular outer rim 60 of the collar has a curving surface which prevents damage to the wires 54 if they are pressed against the collar 50.

Once the clip 10 has been threaded onto the end of the flexible conduit 20, the clip 10 is forced into the circular opening 62 in the wall 12 of the junction box. As the tubular wall 26 of the clip begins to enter the circular opening 62, the outwardly flaring retaining arms 34 and 36 engage the sides of the opening 62. Further inward movement of the clip 10 results in the retaining arms 34 and 36 being flexed radially inwardly. Still further movement of the clip 10 into the junction box moves arcuate outer edges 64 and 66 of the flanges 30 and 32 into engagement with outer surface of the wall 12. The flanges 30 and 32 are bent upwardly as viewed in FIGS. 4 and 5 so that the edges 64 and 66 of the flanges will engage the outer surface of the wall before the major surfaces 68 and 69 of the flange are pressed against the wall. Further movement of the clip into the junction box causes the flanges 30 and 32 to be deflected from the solid line position (FIG. 5) to the dash line position.

When the flanges 30 and 32 have been pressed flat against the wall 12 of the junction box, the lower edge portions 70 and 72 of the retaining arms 34 and 36 clear the inner surface of the wall 12. When this occurs, the resiliently deflected arms 34 and 36 are released and move outwardly to the position shown in FIG. 4. When the inward force against the conduit 20 is relaxed, the flanges 30 and 32 flex in such a manner as to tend to pull the clip 10 out of the junction box. However, the inner ends 70 and 72 (FIG. 4) of the retaining arms 34 and 36 engage the inner surface of the wall 12 to prevent the clip from being pulled out of the junction box.

The inner ends of the retaining arms 34 and 36 are formed with relatively sharp outwardly projecting corners or points 80 and 82 (see FIG. 5) which are interconnected by an arcuate inwardly curving surface 84. The resiliently deflected flanges 30 and 32 press the relatively sharp corners 80 and 82 against the inner surface of the wall 12 of the junction box. This causes the pointed corners 80 and 82 to dig into the wall 12 and provide a solid electrical connection between the clip and the junction box. Since the barbs 22 and 24 are pressed into the conduit 20 as the clip 10 is shoved through the opening 62 in the wall of the junction box, the clip 10 provides a solid electrical connection between the conduit 20 and junction box to ground the conduit.

Once the clip 10 has been connected with the junction box, only the flanges 30 and 32 of the clip are disposed outside the junction box. This provides a neat appearance, prevents the clip from being damaged by foreign objects, and tends to retard unauthorized removal of the conduit 20 from the junction box. In this regard, it should be noted that the barbs 22 and 24 are pressed into the conduit 20 as the clip is inserted into the hole 62 in the wall 12 of the junction box to prevent unthreading of the conduit from the clip. Of course, both the barbs 22 and 24 and the tabs 14 and 16 engage the helical groove 18 in the conduit to prevent it from being pulled out of the junction box.

The clip 10 is advantageously formed from a single piece of metal. Thus, the flanges 30 and 32, retaining arms 34 and 36, and collar 50 are integrally formed. Of course, the single piece construction of the clip facilitates connecting the clip with the end of the conduit 20. When the clip 10 is being formed, elongated stress relief openings 90 and 92 are advantageously formed between the flanges 30 and 32 and tubular body portion 26.

Although the clip 10 has been illustrated herein in association with conduit 20 having only a single helical groove 18 in its outer surface, it is contemplated that a clip constructed in accordance with the present invention could be utilized in association with a conduit having a plurality of helical grooves formed in its outer surface. Of course, the inwardly projecting tabs 14 and 16 and barbs 22 and 24 would be spaced so as to engage the helical grooves as the clip was turned onto the end of the conduit. It should also be noted that although the collar 50 shields the wires 54 from the end of the conduit 20, it is contemplated that under certain circumstances a plastic sleeve may be utilized in association with the end of the conduit in a known manner to further shield the wires from the conduit. In addition, it is contemplated that the clip 10 could be used with conduits other than conduits for holding electrical wires.

In view of the foregoing description, it can be seen that the one piece metal clip 10 is utilized to connect an electrical conduit 20 having a helical groove 18 formed in its outer covering with a junction box. The clip 10 includes a tubular body portion 26 which receives one end portion of the conduit 20. A collar 50 telescopically circumscribes the end portion of the conduit 20 to protect the wires 54 from engagement with any burrs which may be formed at the cut away end of the conduit.

To hold the clip 10 in the junction box, a pair of retaining arms 34 and 36 engage the inner surface of the junction box while flanges 30 and 32 engage the outer surface of the junction box. The flanges 30 and 32 are resiliently deflected as the clip is inserted into the junction box so that the flanges provide a spring force pressing the pointed corners 80 and 82 of the retaining arms 34 and 36 against the inner surface of the junction box to provide a firm electrical connection between the clip and the junction box. In addition, the arcuate outer edges 64 and 66 of the flanges 30 and 32 tend to dig into the outer surface of the wall 12 of the junction box to provide an additional electrical connection between the clip and the junction box.

The inwardly projecting barbs 22 and 24 dig into the bottom of the helical groove 18 in the wall of the conduit 20 to firmly interlock and provide an electrical connection between the conduit and clip. The barbs 22 and 24 prevent the conduit 20 from being unthreaded or turned out of the clip 10. In addition to the barbs 22 and 24, the tabs 14 and 16 engage the helical recess 18 to prevent the conduit 20 from being pulled out of the clip.

I claim:

1. A one-piece, self-retaining metal clip for use in connecting an electrical conduit having a helically grooved outer metal covering and electrical wires therein with a junction box or the like, said clip being adapted to extend through an opening in a wall portion of the junction box, said one-piece metal clip comprising a tubular body portion for extending through the opening in the junction box and into which the electrical conduit extends, said tubular body portion having a first opening at one end thereof through which the electrical wires extend and a second opening at the other end thereof into which said electrical conduit extends, flange means at said other end of said tubular body portion for engaging an outer wall portion of the junction box, said flange means comprising deflectable portions which extend transverse to the axis of said first and second openings and which have surface portions which engage the outer surface of the junction box upon insertion of the clip into the opening in the wall portion of the junction box, retaining arms connected with said tubular portion, said retaining arms projecting outwardly from said tubular body portion and being resiliently deflectable radially inwardly upon insertion of the tubular body portion through the opening in the junction box and springing outwardly upon clearing the wall of the junction box as to engage the inner surface of the wall of the junction box, said retaining arms, in an undeformed position, being separated from said flange means by an axial distance less than the thickness of the wall portion whereby said clip is resiliently clamped to the junction box by said flange means and said retaining arms to positively electrically ground said clip to said junction box, said tubular body portion also having a pair of inwardly extending tabs having an inner elongated edge disposed along a helix of the same pitch as the helical groove in the metal covering for threaded engagement with the helical groove in said metal covering to threadably connect said metal covering with said tubular body portion and a pair of barbs also formed on said tubular body portion for gripping the helically grooved metal covering of the electrical conduit to effect a grounding of the metal covering to said clip, said barbs being diposed along the same helix as the inner edges of said tabs, said barbs having points thereon defining an inscribed circle of smaller diameter than the minor diameter of said helical groove and said points oriented in the same circumferential direction to allow said metal covering to be threaded into said clip but to resist threaded disengagement of said clip and said metal covering, said tabs and said barbs being spaced from said flange means toward said one end of said tubular body portion whereby said tabs and barbs are disposed within the junction box when the electrical conduit is connected with the junction box.

2. A one-piece metal clip as set forth in claim 1 further including collar means connected with said one end of said tubular body portion for shielding the wires against engagement with any burrs which may be formed on the outer end portion of the electrical conduit, said collar means including a rim portion disposable within the electrical conduit in a telescopic relationship with the outer end portion of the electrical conduit.

3. A one-piece metal clip as set forth in claim 1 wherein said tabs have a generally rectangular configuration and said inner end portions have an arcuate configuration and extend transversely to the central axis of said tubular body portion.

4. A one-piece metal clip as set forth in claim 1 wherein said tabs are located at axially and circumferentially offset locations on said tubular body portion.

5. A one-piece metal clip as set forth in claim 1 wherein said flange means includes a pair of flange portions which extend radially outwardly from said tubular body portion and have arcuate outer end portions which are pressed against the outer surface of the junction box to provide additional electrical connections between the junction box and said clip.

6. A one-piece metal clip for use in connecting an electrical conduit having a helically grooved outer metal covering and electrical wires therein with a junction box or the like, said clip being adapted to extend through an opening in a wall portion of the junction box, said one-piece metal clip comprising a tubular body portion for extending through the opening in the junction box and into which the electrical conduit extends, said tubular body portion having a first openinng at one end thereof through which the electrical wires extend and a second opening at the other end thereof into which said electrical conduit extends, flange means at said other end of said tubular body portion for engaging an outer wall portion of the junction box, said flange means comprising deflectable portions which extend transverse to the axis of said first and second openings and which have surface portions which engage the outer surface of the junction box upon insertion of the clip into the opening in the wall portion of the junction box, retaining arms on a wall portion of said tubular portion, said retaining arms projecting outwardly from said tubular body portion and being resiliently deflectable radially inwardly upon insertion of the tubular body portion through the opening in the junction box and springing outwardly upon clearing the wall of the junction box so as to engage the inner surface of the wall of the junction box whereby said clip is clamped to the junction box by said flange means and said retaining arms, said tubular body portion also having a pair of barbs disposed intermediate said flange means and said one end portion of said tubular body portion for engaging the helically grooved metal covering of the electrical conduit to effect a grounding of the covering to said clip and to retard relative movement between the electrical conduit and said tubular body portion, said tubular body portion including a plurality of edge portions extending from said flange means toward said open end portion of said tubular body portion, each of said barbs being disposed along an associated one of said edge portions, said barbs being disposed along a helix of the same pitch as the helical groove in the metal covering to enable said barbs to engage the helical groove at spaced apart locations along the helical groove.

7. A one-piece metal clip as set forth in claim 6 wherein each of said barbs includes a pointed end portion disposed inwardly of an inner surface of said tubular body portion.

* * * * *